(12) United States Patent
Ganji et al.

(10) Patent No.: US 8,640,528 B2
(45) Date of Patent: Feb. 4, 2014

(54) LUBRICATION CONDITION MONITORING

(75) Inventors: Ali Ganji, Nieuwegein (NL); Jozef Johannes Holsnijders, Leerdam (NL)

(73) Assignee: Aktiebolaget SKF, Göteborg (SE)

( * ) Notice: Subject to any disclaimer, the term of this patent is extended or adjusted under 35 U.S.C. 154(b) by 200 days.

(21) Appl. No.: 13/144,609

(22) PCT Filed: Jan. 28, 2009

(86) PCT No.: PCT/EP2009/000536
§ 371 (c)(1),
(2), (4) Date: Jul. 14, 2011

(87) PCT Pub. No.: WO2010/085971
PCT Pub. Date: Aug. 5, 2010

(65) Prior Publication Data
US 2011/0265569 A1    Nov. 3, 2011

(51) Int. Cl.
*G01N 33/26* (2006.01)
(52) U.S. Cl.
USPC ..................................... 73/53.05
(58) Field of Classification Search
USPC ..................................... 73/53.05
See application file for complete search history.

(56) References Cited

U.S. PATENT DOCUMENTS

| 5,090,225 | A | * | 2/1992 | Schimion ...................... 72/45 |
| 6,339,961 | B1 | | 1/2002 | Goodman et al. |
| 6,546,785 | B1 | | 4/2003 | Discenzo |
| 2002/0032617 | A1 | * | 3/2002 | Takahashi et al. .............. 705/26 |
| 2008/0065354 | A1 | | 3/2008 | Yoshioka et al. |

FOREIGN PATENT DOCUMENTS

| FR | 2596510 A1 | 10/1987 |
| WO | WO02090941 A2 | 11/2002 |

* cited by examiner

*Primary Examiner* — Peter Macchiarolo
*Assistant Examiner* — Alex Devito
(74) *Attorney, Agent, or Firm* — Bryan Peckjian; SKF USA Inc. Patent Department

(57) ABSTRACT

The present invention relates to a method of determining a lubrication parameter indicative of a lubrication condition of an oil-lubricated rolling element bearing. The method comprises measuring high-frequency structure-borne acoustic emissions generated by asperity contact between rolling contact surfaces of the bearing, to provide a measured signal. The emitted acoustic energy is then extracted from the measured signal and the lubrication parameter is determined from the acoustic energy. The determination is made on the basis of a power-law relation between acoustic energy and the lubrication parameter.

10 Claims, 4 Drawing Sheets

LUBRICATION CONDITION MONITORING

FIELD OF THE INVENTION

The present invention relates to a method for lubrication condition monitoring in an oil-lubricated rolling element bearing by measuring structure-borne acoustic emission.

BACKGROUND OF THE INVENTION

In order for rolling element bearings to operate in a reliable way, they have to be adequately lubricated. The main purpose of the lubricant is to prevent metallic contact between rolling elements, raceways and cages and thus prevent wear of the bearing. The lubricant is also used to protect the bearing surfaces against corrosion. It is therefore important to choose both the proper lubricant and the proper lubrication method for each individual bearing application, as well a correct maintenance program.

In applications where the lubrication for a bearing or bearings needs to be replenished or replaced, this can be done on the basis of relubrication intervals prescribed by the bearing manufacturer or the supplier of a lubrication system for the bearings. A generous safety factor is built into the prescribed intervals, but when, for example, extreme contamination enters a circulating lubricant, the prescribed interval may be too short. In other instances, the prescribed intervals can be excessively long, leading to the replacement of lubricant that still has a considerable useful life.

In the case of bearings in large machinery which are lubricated by a circulation lubrication system, for example, samples of the circulating oil can be taken on a regular basis to determine when an oil change is needed. One way making this determination is to measure the dielectric constant of the oil sample. It has been found that the dielectric constant of an oil changes as the oil degrades and becomes contaminated. And as an oil degrades, it loses its ability to effectively separate the rolling contact surfaces in a bearing.

Methods that involve taking oil samples to determine the actual condition of the lubricant have disadvantages. It is necessary to interfere with the lubrication system and the condition of the lubricant cannot be monitored continuously. Furthermore, a deterioration in the lubrication condition of a bearing need not be due to a deterioration in the condition of the lubricant. If, for example, an oil filter becomes clogged, a bearing might experience a starved lubrication condition simply because its supply of oil is interrupted. It is therefore advantageous to monitor lubrication condition.

In one known method for monitoring the lubrication condition of a bearing, the film thickness of the lubricant between the rolling elements and the bearing raceways is measured by measuring the capacitance between the bearing inner and outer ring. One such system is the LubCheck™ system of SKF. In this method, the bearing has to be electrically isolated from the electrical earth, i.e. the machine frame in which the bearing is mounted. Such a system is thus mainly suitable for laboratory testing of bearings. Also, the measurement method interferes with normal bearing operation.

Another way of estimating the lubricant film thickness is to measure the reflection of ultrasound from the oil layer in a bearing. Assuming the oil properties are known, the oil film thickness can be calculated from the reflection values. Again, this is an intrusive method that can be detrimental to bearing operation.

Consequently, there is a need for method of monitoring the lubrication condition in a bearing that is suitable for integration in an industrial environment and that can be implemented on-line, without affecting the normal operation of the bearing.

SUMMARY OF THE INVENTION

The present invention lies in a method of monitoring the lubrication condition of an oil-lubricated rolling element bearing by means of determining a lubrication parameter indicative of the lubrication condition. In a first step, high-frequency structure-borne acoustic emissions (AE) are measured. The measured acoustic emissions are generated as a result of asperity contact between rolling contact surfaces of the bearing, and provide a measured signal. In a second step, emitted acoustic energy is extracted from the measured signal. In a third step, the lubrication parameter is determined from the emitted acoustic energy, on the basis of a power-law relation between acoustic energy and the lubrication parameter.

The relation may be expressed as:

$$E(c) = B \cdot c^x, \text{ where}$$

E is the emitted acoustic energy in the sensed signal [Volts]
c is the lubrication condition parameter [dimensionless]
B is a scaling factor [dimensionless constant]
x is a known scaling exponential [dimensionless constant].

Thus, by monitoring and quantifying the level of acoustic emission generated in a bearing, it is possible to monitor and quantify the lubrication condition.

The present invention also defines a lubrication condition monitoring device that is arranged to perform the method of the invention, the device comprising:
  an acoustic emission sensor adapted to be mounted to one of a bearing inner ring, a bearing outer ring or a housing in which the bearing is mounted;
  signal processing means adapted to extract emitted acoustic energy from an acoustic emission signal measured by the acoustic emission sensor and to determine a lubrication parameter on the basis of a power-law relation between emitted acoustic energy and the lubrication parameter.

In one embodiment of the invention, the lubrication condition parameter used to indicate lubrication condition is specific film thickness, λ. This parameter is obtained by dividing a minimum film thickness (under an elastohydrodynamic lubrication condition) by a combined root-mean-square roughness of the rolling contact surfaces.

In another embodiment, the lubrication condition parameter used to indicate lubrication condition is viscosity ratio, κ. The viscosity ratio is a ratio of a lubricant's actual viscosity to a minimum, rated viscosity that the lubricant must possess at its normal operating temperature in order to form an adequate oil film.

Both of these lubrication parameters are indicative of a degree of surface separation between rolling contact surfaces in a bearing and are likewise indicative of the degree of asperity contact.

Specific film thickness can be determined according to the invention by means of the following relationship:

$$E(\lambda) = B^* \lambda^{-0.36}$$

E is the emitted acoustic energy in the sensed signal (Volts),
λ is the specific film thickness (dimensionless),
B is the scaling factor (dimensionless constant).

Viscosity ratio can be determined according to the invention by means of the following relationship:

$$E(\kappa) = B^* \kappa^{-0.47}$$

E is the emitted acoustic energy in the sensed signal (Volts),
κ is the viscosity ratio (dimensionless),
B is the scaling factor (dimensionless constant).

It has been found that a scale invariance exists in the relationship between emitted acoustic energy and lubrication condition. In other words, the relationship does not change when the energy scale is multiplied by a common scaling factor. If the scaling factor, B, in the above equations is known, the κ value or the λ value (and thereby the lubrication condition) can simply be calculated using the appropriate equation.

If the scaling factor is unknown, it can be estimated. The scaling factor is influenced by several parameters. One parameter is the distance between the AE sensor and the source of the acoustic emission, whereby the detected acoustic energy obeys an inverse square law with distance from the AE source. The level of acoustic energy, i.e. the scaling factor, is also influenced by bearing speed and bearing load. An increase in bearing speed and an increase in bearing load causes a corresponding increase in acoustic energy.

Thus in a further development, the method according to the invention comprises a step of determining bearing speed and/or a step of determining bearing load. The determined speed and or the determined load is then used as an input parameter to estimate the scaling factor in the power-law relation between acoustic energy and lubrication condition. This development is advantageous when the operating conditions of a bearing to be monitored are variable.

In another embodiment of the invention, the known relationship between acoustic energy and lubrication condition is used to generate a library of possible combinations of acoustic energy values and κ or λ values. A correct, reference set of values can then be selected by means of a calibration process. In such a calibration process, the actual level of acoustic energy emitted from a bearing to be monitored is measured. Next, a sample of the bearing's lubricating oil is taken and the actual lubrication condition is determined, at least by measuring the kinematic viscosity of the oil sample. A combination of values is therefore obtained that can be compared with a stored set of combinations obtained using a specific scaling factor. This embodiment of the invention is advantageous when the operating conditions of the bearing remain essentially constant.

In a further advantageous development of the inventive method, the measured AE signal is analyzed within a frequency range of 250-700 kHz. In other words, the emitted acoustic energy is extracted from the frequency components of the measured signal in this range. The advantage of this further development is that acoustic emissions in the frequency range of 250-700 kHz are particularly associated with asperity contact in rolling element bearings, meaning that unwanted acoustic emissions (noise) are filtered out.

One advantage of the inventive method is that the actual lubrication condition in a bearing can be monitored. In this way, lubrication monitoring can be used in a preventive action, such that an abnormal bearing condition can be detected well before damage to the bearing occurs. The method makes it possible to detect when a bearing is approaching a starved or boundary lubrication condition, because the emitted acoustic energy will follow a predictable and identifiable trend. Thus, a bearing (or several bearings in an oil lubricated system) can be re-lubricated well before damage occurs.

A further advantage of monitoring the actual lubrication condition in a bearing is that the lubrication condition can be adapted to different demands. It is thus easy to change and monitor the lubrication condition in a bearing depending e.g. on different loads imposed on the bearing or different operating temperatures. In this way, the bearing can be run under optimal conditions. In one example, this will mean that the bearing is run with an optimal amount of lubricant. Since an excessive amount of lubricant in a bearing will lead to an increase in friction loss, energy can be saved in this way. It is also possible to change the type, i.e. viscosity, of the lubricant and still be sure that the optimal amount of lubricant is used due to the lubrication condition monitoring. This may reduce the friction loss further.

In a further advantageous development of the inventive method, a signal is sent out when the lubrication parameter falls below a predetermined value. Such a signal may be used e.g. by a circulating oil lubrication system, to increase the flow rate of oil supplied to the bearing. Similarly, if the lubrication condition is monitored continuously, a monitoring system will detect an increase in the determined lubrication parameter. This could indicate that the bearing is being supplied with too much oil, in which case a signal can be sent out to reduce the flow rate of the oil. Such a signal may also be used to drain oil from the bearing if the operating condition of the bearing changes. In this way, friction losses due to excessive oil can be avoided.

Other advantages of the present invention will become apparent from the detailed description and accompanying drawings.

BRIEF DESCRIPTION OF DRAWINGS

The invention will be described in greater detail in the following, with reference to the embodiments that are shown in the attached drawings, in which.

DETAILED DESCRIPTION

The embodiments of the invention with further developments described in the following are to be regarded only as examples and are in no way to limit the scope of the protection provided by the patent claims.

In the inventive method described herein, Acoustic Emission (AE) signals are measured. A commonly accepted definition for AE is transient elastic waves within a material due to localized stress release. It is associated with a range of phenomena which generate broadband activity from the transient release of stored elastic energy from localised sources. The elastic stress waves are generated in the ultrasonic frequency range and are structure borne. The waveform detected by a sensor will therefore be distorted by frequency-dependent attenuation such as dispersion, multi-path propagation and mode conversion. Significant acoustic emission is associated with material deformation, fracture or frictional processes, where the emitted signal has a surface or subsurface origin. In the inventive method, surface processes such as impacts and friction are analysed. Specifically, the acoustic emissions associated with metal-to-metal contact between rolling contact surfaces in a bearing are analyzed in order to determine the lubrication condition in the bearing.

Figure 1:
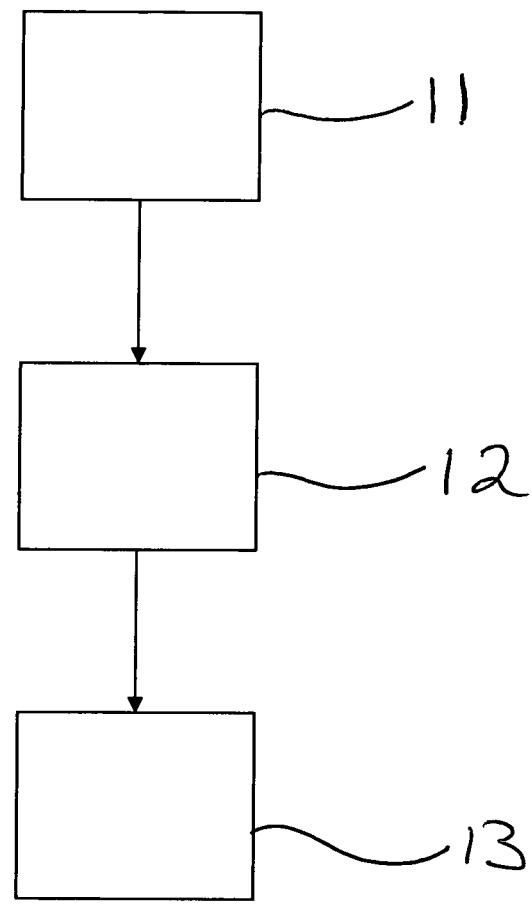
FIG. 1 shows a flow chart of the inventive method.

FIG. 1 shows a flow chart of the method according to the invention. In a first step 11, high-frequency structure-borne acoustic emissions from a bearing are measured. As mentioned, the emissions are generated from metal-to-metal contact between rolling contact surfaces in the bearing and are measured using an acoustic emission sensor (AE sensor), to provide a measured signal. In a second step 12, the measured signal is analyzed and the acoustic energy in the measured signal is extracted. In a third step, a lubrication parameter indicative of the lubrication condition is determined from the extracted acoustic energy. According to the invention, the determination is made on the basis of a power-law relation between emitted acoustic energy and the lubrication parameter. The method will further be explained with reference to FIG. 2 to FIG. 5.

Figure 2:
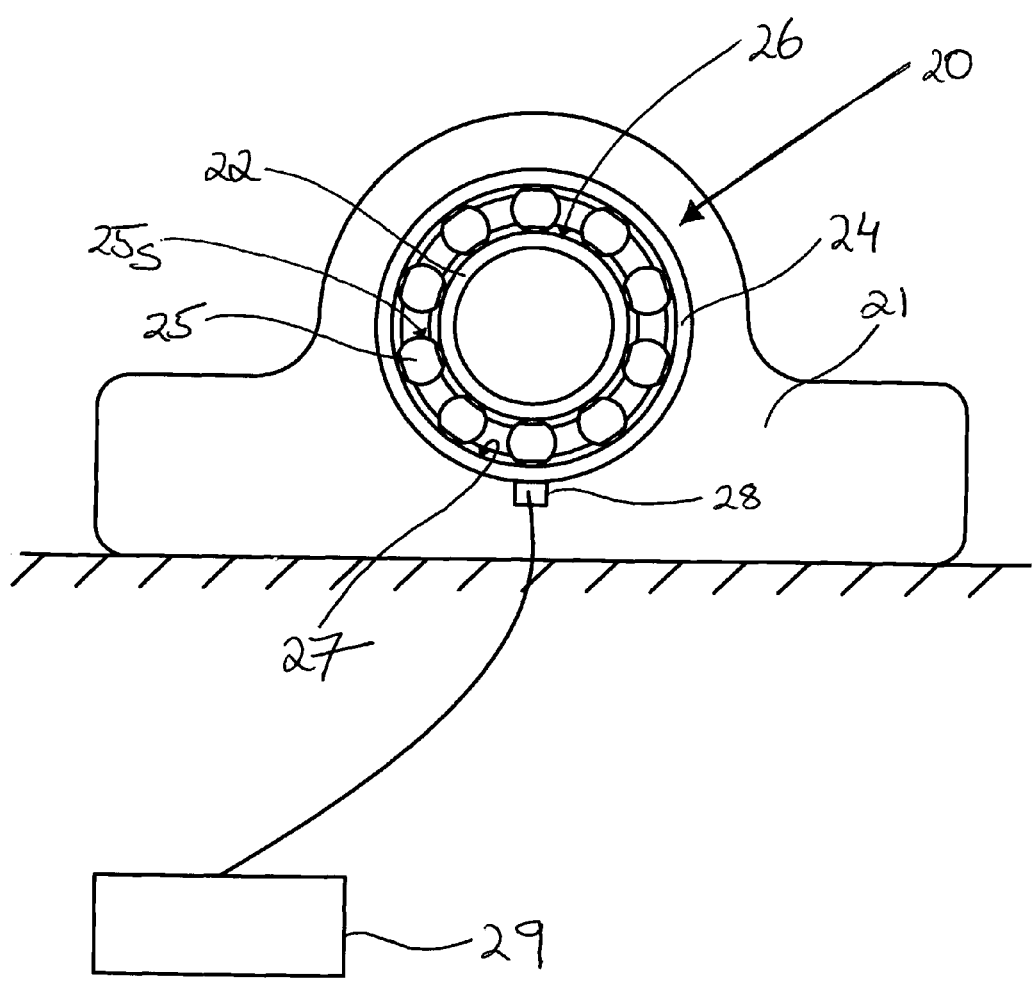
FIG. 2 is a schematic representation of a system in which the method according to the invention may be applied.

FIG. 2 shows an example of a system comprising a bearing to be monitored and a lubrication condition monitoring device that is arranged to execute the method according to the invention. The bearing in this example is a radial rolling element bearing 20, comprising an inner ring 22, an outer ring 24 and rolling elements 25 disposed therebetween. Thus an outer diameter of the bearing inner ring 22 defines an inner raceway 26 for the rolling elements 25 and an inner diameter of the bearing outer ring 24 defines an outer raceway 27. Further, the bearing 20 is mounted in a housing 21 and is lubricated with an oil (not shown).

The lubrication condition monitoring device comprises an acoustic emission sensor (AE sensor) 28 and a signal processor 29 that is arranged to process AE signals detected by the sensor. In the example of FIG. 2, the AE sensor 28 is mounted on the bearing outer ring 24, which ring is non-rotational during bearing operation. The AE sensor 28 can also be positioned on the housing 21, or on some other fixed structure to which the bearing is mounted. In applications where the bearing inner ring 22 is non-rotational in operation, the AE sensor 28 may be mounted, for example, in a notch in an inner diameter (bore) of the inner ring 22.

During bearing operation, an outer surface 25s of the rolling elements 25 is in rolling contact with the inner raceway 26 and the outer raceway 27. These rolling contact surfaces 25s, 26, 27 have a certain roughness due to asperities. Depending on the lubrication condition in the bearing, an oil film that separates the rolling contact surfaces may not be sufficiently thick to prevent asperity contact between the rolling element surfaces 25s and the bearing raceways 26, 27. This asperity contact (metal-to-metal contact) within the bearing 20 generates acoustic emission. The level of acoustic emission detected by an AE sensor mounted in direct or indirect contact with a bearing ring is therefore indicative of the degree of asperity contact between the rolling element surfaces and the bearing raceways, and is thus indicative of the lubrication condition within the bearing.

It is important that there is good mechanical contact between the AE sensor 28 and surface of the bearing or bearing housing to which it is mounted, to ensure proper transmission of the propagated stress waves to the sensor 28. This can be achieved in different ways. One way is to machine a flat surface in the outside diameter of the bearing outer ring 24 and mount the AE sensor on the flat surface. Since the AE sensor may be quite small, this mounting technique is possible to use also for relatively small bearings. Another way of mounting the AE sensor to the bearing is to manufacture the AE sensor such that its detecting surface has the same radius of curvature as the bearing surface with which it will be in contact. This will also enable a mating contact between the AE sensor and the bearing. For larger bearings, is also possible to machine a notch in the outer ring, in which the AE sensor can be mounted. As will be understood, any machining in a bearing ring should be performed such that the function of the bearing is not impaired.

In addition to ensuring a mating fit between the contacting surfaces of the bearing or bearing housing and the AE sensor, the transmission of acoustic waves to the AE sensor can be improved by using grease, e.g. vacuum grease, or an oil as a coupling medium between the sensor and the surface it is mounted to.

The AE sensor 28 can be mounted at any angular position of the bearing. The mounting position will depend on the available space in the machine in which the bearing is used. A preferred mounting position for the AE sensor is a position that is in line with the direction of the load on the bearing. Hence, for a radially loaded bearing, the AE sensor 28 should be radially mounted. In the case of thrust bearings, for example, which are subjected to axial loading, the AE sensor should be axially mounted, i.e. on a side face of the bearing ring that is non-rotational in operation. Furthermore, the mounting position is preferably in line with the bearing loaded zone and in line with the region of rolling contact. Since the acoustic waves propagate from the contact surface between the rolling elements 25s and the raceways 26, 27, the signal quality will be best directly opposite the contact region. This will reduce interfering acoustic waves caused by reflections from the measured signal and from acoustic waves from other sources in the machinery. It will also improve the signal-to-noise ratio of the signal.

As mentioned, another possible mounting position is on the bearing housing 21 (or equivalent structure) in which the bearing 20 is mounted. A bearing is normally mounted with a press-fit, which will allow the acoustic waves to propagate from the bearing to the AE sensor 28. In this way, the bearing may be replaced without having to remove the AE sensor. Again, the AE sensor is preferably mounted on a position on the housing that is directly in line with: the bearing loaded zone, the direction of loading, and the region of rolling contact.

The AE sensor 28 is adapted to work in the ultrasound range of above 100 kHz. An advantage of this is that interfering low frequency vibrations can be filtered out. Another advantage is that high frequencies have a shorter wavelength than low frequency waves, which means that when the AE sensor is mounted close to the rolling contact surfaces, most high frequency waves, especially the ones with a high amplitude, reaching the AE sensor are likely to originate from the rolling contacts.

In the invention, AE signals in the range of 250 kHz to 700 kHz are preferably analyzed. It has been found that waves with a high energy are emitted in this range due to asperity contact in a bearing, i.e. when a rolling element comes in direct contact with a bearing raceway due to an insufficiently thick lubricant film there between. The AE sensor 28 or the signal processor 29 is thus advantageously provided with a band-pass filter having cut-off frequencies in the range between 100 kHz and 1000 kHz. The AE sensor is in one example a piezo-ceramic sensor, but other types of sensors can also be used.

According to the invention, an AE signal emitted from an operating bearing is analyzed in order to monitor the lubrication condition in the bearing. In one embodiment of the inventive method, a threshold-based signal processing is used to analyze the AE signal measured by the AE sensor. This processing method will be explained with reference to FIG. 3, which shows a graph of a signal pulse (waveform) associated with an acoustic emission event, whereby the abscissa 31 represents time t (in milliseconds) and the ordinate 32 represents signal amplitude A (in millivolts).

In this processing method, a number of threshold crossings 33 is counted, i.e. the number of times when the amplitude A of the detected signal exceeds a threshold level TL. At the same time, the time between the first threshold crossing $TC_1$ and the last threshold crossing $TC_n$, i.e. the duration of the signal, is measured. The number of threshold crossings (AE count) during a specific time interval (AE duration) is used to quantify the signal. The threshold level TL is selected such that interfering noise from other sources are below the threshold level and such that acoustic emissions emitted by the bearing exceeds the threshold level. A longer signal duration with several threshold crossings will indicate that an acoustic emission with relatively high energy has been emitted, compared to a short signal duration with only a few threshold crossings, which will indicate that an acoustic emission with low energy has been emitted.

The high frequency signal measured using the AE sensor is preferably filtered and processed before digital signal processing is performed, partly in order to reduce noise (unwanted AE signals). One way is to output an envelope signal having a limited frequency response, which will simplify the signal conversion. In one example, the average signal level of the acoustic emission signal is used, which is a measure of the continuously varying and averaged amplitude, i.e. the rectified signal, of the measured acoustic emission signal. The bandwidth of such a signal may e.g. be in the range of 10 kHz. The bandwidth should be high enough to be able to detect the acoustic emissions, i.e. the rise time must be high enough to detect the signal, but should at the same time be able to filter out some noise. The signal can also be averaged in other ways, e.g. by a root mean square conversion.

From the enveloped AE signal, the acoustic energy in the signal can be obtained from the Measured Area under the Rectified Signal Envelope (MARSE). The acoustic energy can also be extracted from a frequency-domain analysis of the enveloped time signal.

Figure 4:
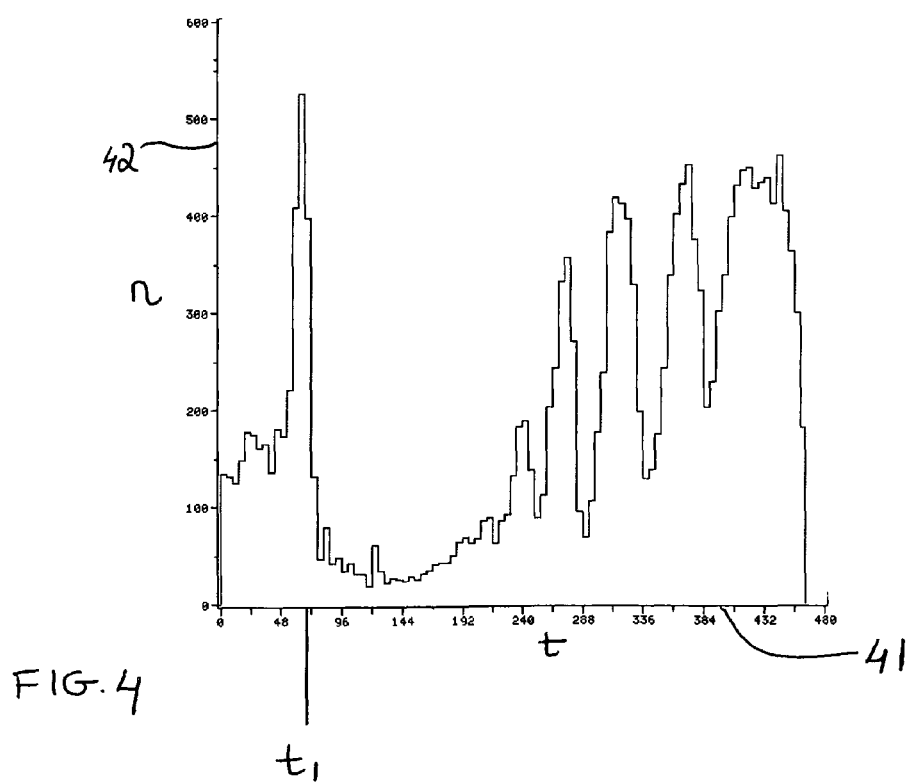
FIG. 4 is a graph of the number of threshold crossings n against time t, for a varying lubrication condition.

The effect of lubrication condition on acoustic emission is demonstrated in the graph of FIG. 4. The abscissa 41 represents time t (in seconds) and the ordinate 42 represents AE activity expressed in terms of number of threshold crossings n which were counted during a test in which the lubrication condition in a running bearing was varied. At the beginning of the test, the bearing was run in an unlubricated condition. It can be seen in FIG. 4 that the number of threshold crossings increases rapidly for a dry-running bearing. At time $t_1$, a few drops of oil were injected into the bearing, which caused a significant decrease in the number of threshold crossings. The oil forms a lubricating film between the rolling contact surfaces, which reduces asperity contact and therefore acoustic emission. In the test described, the bearing was open (unsealed), meaning that the lubricating oil could escape, and no more lubricant was added. Consequently, after approximately 190 seconds, the bearing began to run towards a starved lubrication condition.

In the field of rolling element bearings, lubrication condition is often expressed in terms of a lubrication parameter that represents the ability of a lubricant to form an oil film that separates the rolling elements from the raceway surfaces. The lubrication parameter is therefore also indicative of the degree of asperity contact between the rolling contact surfaces in the bearing. One such lubrication parameter is the viscosity ratio, δ (kappa), of a lubricant. To form an adequate lubricant film, the lubricant must have a given minimum viscosity, or rated viscosity, at its normal operating temperature. The lubrication condition is expressed by the ratio of the actual viscosity to the rated viscosity. The actual viscosity can be measured and the rated viscosity can be obtained from tables supplied by bearing manufacturers.

Another lubrication parameter that is indicative of the degree of asperity contact between rolling contact surfaces is the specific film thickness, λ, also known as the lambda ratio, which can be obtained from the following relationship:

$$\lambda = \frac{h_{min}}{R_q}$$

where
λ=lubrication parameter (specific film thickness)
$h_{min}$=minimum film thickness at the operating viscosity of the lubricant [m]
$R_q$=combined RMS surface roughness of rolling contact surfaces [m]

Thus, asperity contact between rolling contact surfaces is a function of both film thickness and combined surface roughness. All else being equal, smoother surfaces can therefore operate with a thinner film and still remain in an elastohydrodynamic lubrication (EHL) regime. In general, a specific film thickness of greater than four indicates complete surface separation. A transition from full EHL to mixed lubrication (partial EHL film and some asperity contact) occurs in a λ range between one and four. At values less than one, boundary lubrication conditions ensue, with continual asperity contact and little contribution from oil films.

Because of the correlation between asperity contact and specific film thickness, there is also a correlation between acoustic emission and specific film thickness. Previously, the nature of the correlation had been unknown.

Based on the understanding that viscosity is the dominant parameter influencing a lubricant's ability to form an oil film, the present inventors conducted tests to investigate the correlation between acoustic emission and lubrication condition by measuring the AE generated at different lubrication conditions, whereby the different lubrication conditions were obtained by varying the viscosity of the oil lubricant.

The test conditions were as follows. A deep groove ball bearing was run on a test rig under a purely radial load of 18 kN and at a speed of 6000 rpm. The test bearing was supplied with a constant flow of lubricating oil, at a rate of 1 l/min. Lubricating oils of varying viscosity were used and the oil was changed step-wise from the thickest of the test oils to the thinnest of the test oils.

Furthermore, an acoustic emission sensor was mounted on the test bearing housing, to monitor AE activity, and a thermocouple was mounted on the bearing outer ring to measure bearing temperature. In order to study the specific film thickness behaviour in time, oil samples were taken at regular intervals and the kinematic viscosity of the oil samples was measured. As mentioned, specific film thickness is obtained by dividing the minimum film thickness $h_{min}$ by the combined surface roughness $R_q$. The minimum film thickness was calculated on the basis of the Dowson and Higginson formula (see, for example, Dowson and Higginson's "Elastohydrodynamic Lubrication", published by Pergamon Press). Other suitable formulations can also be used. The surface roughness of the bearing inner and outer raceways and of the rolling elements was measured prior to the start of the test, to obtain a value for $R_q$.

Throughout the test, acoustic emission was monitored and approximately 30 minutes before each oil sample was taken, the AE signal was analyzed to determine the acoustic energy associated with the lubrication condition at that time. The signal was repeatedly recorded for a duration of 2 seconds at intervals of 172 seconds. Thus, 10 signal recordings were made prior to each oil sample being taken. Using a digital signal processor, each signal recording was processed by means of Fast Fourier Transformation and the energy in the signal was calculated from the corresponding FFT spectrum. Specifically, the signal energy in a frequency bandwidth of 100-500 kHz was calculated, and an acoustic energy value was obtained from the average of the 10 calculated signal energies.

The test was then repeated at a different bearing speed, namely 4000 rpm, while all other test conditions remained the same. Finally, the specific film thicknesses calculated for the various measured oil viscosities in each test were plotted against the acoustic energy values associated therewith. The results of the plot are shown in the graph of FIG. 5, whereby the abscissa 51 represents specific film thickness $\lambda$ (dimensionless parameter) and the ordinate 52 represents acoustic energy E (in $mV_{RMS}$).

Figure 5:
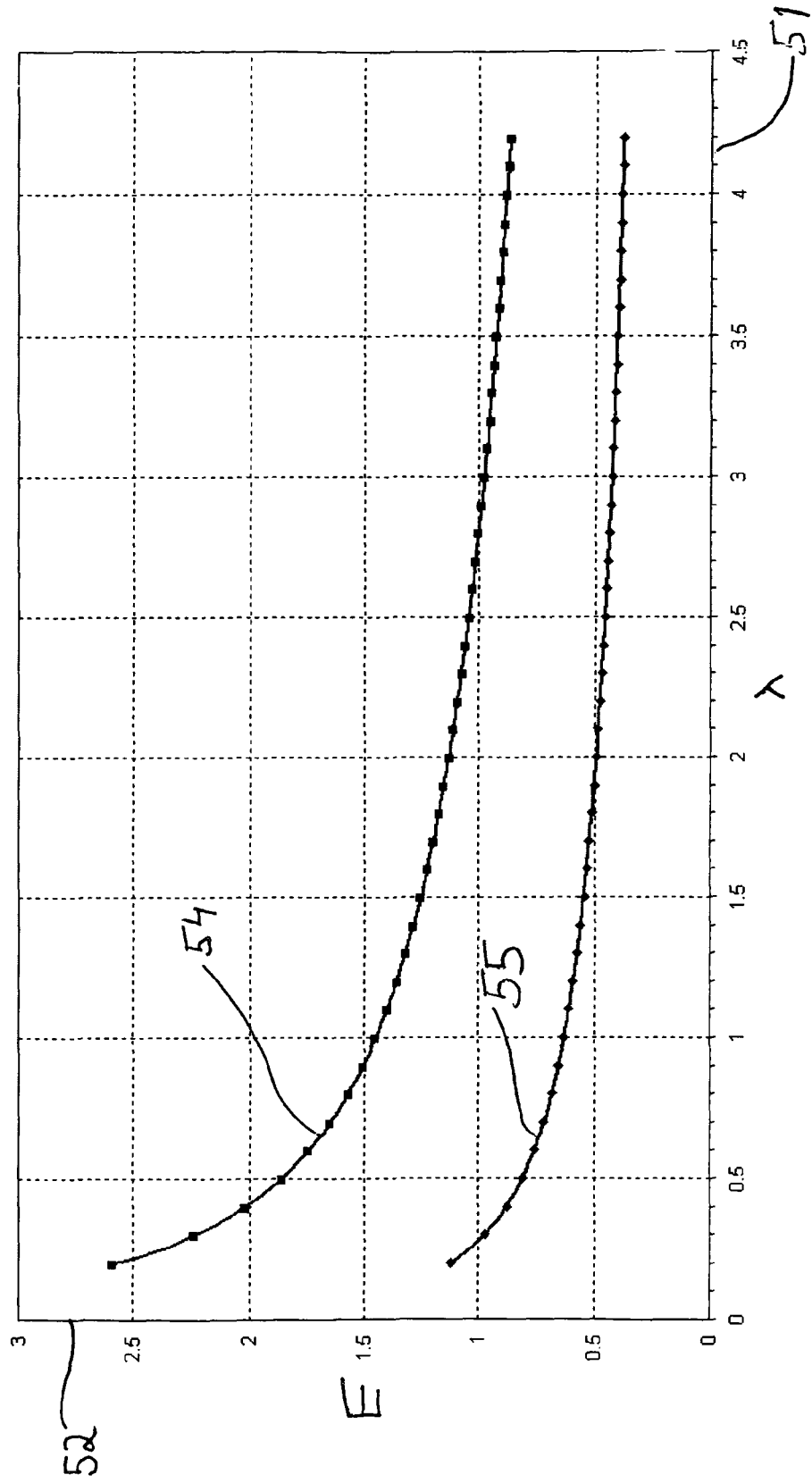
FIG. 5 is a graph of measured acoustic energy against calculated specific film thickness, showing two curves fitted through data points obtained from two tests conducted at different bearing speeds.

As shown in FIG. 5, a curve may be fitted through the data points obtained for each of the tests. The upper curve 54 relates to the test conducted at a bearing speed of 6000 rpm; the lower curve 55 relates to the test conducted at a bearing speed of 4000 rpm. Each curve 54, 55 describes a power-law function between acoustic energy E and specific film thickness $\lambda$, which function can be expressed as:

$$E(\lambda) = B \cdot \lambda^{-0.36},\quad \text{[Equation 1]}$$

whereby B is a scaling factor.

For the function described by the upper curve 54, the scaling factor is equal to 1.45.

For the function described by the lower curve 55, the scaling factor is equal to 0.63.

During the tests, the viscosity ratio ($\kappa$) of each oil sample was also determined from the measured kinematic viscosity and the rated viscosity obtained from tables published in the SKF General Catalogue. A corresponding plot of acoustic energy against viscosity ratio also revealed a power-law relation between acoustic energy E and viscosity ratio $\kappa$.

Furthermore, equation 1 can be reformulated in terms of viscosity ratio by substituting specific film thickness $\lambda$ for viscosity ratio $\kappa$ using the following generally accepted approximation:

$$\kappa \approx \lambda^{1.3}$$

The substitution results in the following relationship between acoustic energy E and viscosity ratio $\kappa$:

$$E(\kappa) = B \cdot \kappa^{-0.47},\quad \text{[Equation 2]}$$

whereby B is a scaling factor.

Thus, acoustic emission in a rolling element bearing is dependent on the lubrication condition in the bearing and the dependency is quantifiable.

A number of parameters influence the scaling factor B in equations 1 and 2. As shown in FIG. 5, bearing speed affects the acoustic energy emitted from asperity contact in a bearing. At a higher rotational speed, more metal-to-metal contacts will occur within a given period that at a lower rotational speed, leading to a higher level of acoustic energy. Similarly, it can reasonably be assumed that a higher level of acoustic energy will be generated at a high bearing load that at a low bearing load. Another influence on the scaling factor is the distance between the AE sensor and the source of the acoustic emission. An AE sensor mounted on the bearing outer ring, for example, will detect a higher level of acoustic energy than an AE sensor mounted on the bearing housing.

Nevertheless, although the level of acoustic energy generated will change depending on the bearing's operating parameters and the location of the AE sensor, there is an underlying dependency (scale invariance) on the lubrication condition of the bearing. Consequently, there will be an identifiable trend in the AE measured as the lubrication condition deteriorates over time.

It should be noted that lubrication condition monitoring according to the invention is most advantageously performed in systems which comprise oil-lubricated bearings, for the following reason.

Specific film thickness is calculated on the basis of the Dowson and Higginson formula, or equivalent, slightly modified versions thereof. The formula accurately predicts film formation in an oil lubricated bearing, but not in a grease lubricated bearing. Oil film formation in grease lubricated bearings cannot, as yet, be reliably predicted.

In one embodiment of the method according to the invention, and of a device arranged to execute it, the lubrication condition ($\lambda$ or $\kappa$) of the bearing is estimated from the emitted acoustic energy using a stored table of values. As will be understood, equations 1 and 2 can be used to generate a library of "curves" of $\lambda0$ and/or $\kappa$ values with corresponding acoustic energy values. Thus, when a lubrication condition monitoring device according to the invention is first installed, the acoustic energy generated at the desired operating conditions of the bearing to be monitored is measured. Next, by taking an oil sample and measuring the oil's kinematic viscosity, the viscosity ratio $\kappa$ is easily determined. By measuring the surface roughness of the rolling contact surfaces, the specific film thickness $\lambda$ can be determined. The curve in the stored library which contains the appropriate combination of acoustic energy value and $\lambda$ or $\kappa$ value can then be selected as the reference curve to be used during the lubrication condition monitoring. In other words, the lubrication condition monitoring device is calibrated.

When, for example, an oil change occurs, it is advantageous to recalibrate the device. This can be done by repeating the measurements described above. Alternatively, the acoustic energy emitted from the bearing to be monitored can be measured after, say, one hour of operation, to allow the bearing to reach its normal operating temperature. Assuming that the fresh oil results in a fully flooded EHL lubrication condition, i.e. a $\lambda$ value of four or a $\kappa$ value of six, the appropriate reference curve can be selected on the basis of these 'maximum' values and the measured acoustic energy. Recalibration can also be advisable in order to take account of changing surface roughness values in the bearing. Over time, asperities in the rolling contact surfaces can become somewhat smoother, and this affects the specific film thickness $\lambda$.

The above-described method is sufficient when the bearing to be monitored operates at essentially constant load and speed. If these operating parameters vary, then in order to estimate lubrication condition, the scaling factor B from equations 1 and 2 needs to be determined. As mentioned, the scaling factor is thought to be mainly influenced by the distance between the AE source and the AE sensor, bearing load and bearing speed. The distance between the AE source and the AE sensor will remain constant during monitoring (unless it is deliberately moved), and its influence on the scaling factor simply obeys the inverse square law for acoustic energy. The influence of bearing load and bearing speed on the scaling factor can be determined experimentally.

Thus, under varying operating conditions, the method according to the invention comprises a step of measuring bearing load and/or bearing speed and the step of determining comprises using the measured load and/or speed to estimate the scaling factor in the power-law relation between acoustic energy and lubrication condition.

The method according to the invention enables lubrication condition to be monitored in a non-destructive and non-intrusive manner. The method can be used, for example, to determine when an oil change is necessary. Correspondingly, a device according to the invention can be configured to output an alarm when the estimated lubrication parameter value falls below a predetermined limit e.g. a λ value of 1.2 which indicates that the bearing is approaching a boundary lubrication condition. The device can also be configured to output an alarm if a sudden and drastic change in lubrication condition is detected, which change cannot be attributed to the operating conditions. Such a change could be the result of, for example, a blocked oil filter. In a lubrication system comprising a lubrication condition monitoring device according to the invention, the device can therefore be configured to output a shutdown command when a drastic change is detected, to shut down the bearing being monitored and its oil supply.

The invention is not to be regarded as being limited to the embodiments described above, a number of additional variants and modifications being possible within the scope of the subsequent patent claims.

Figure 3:
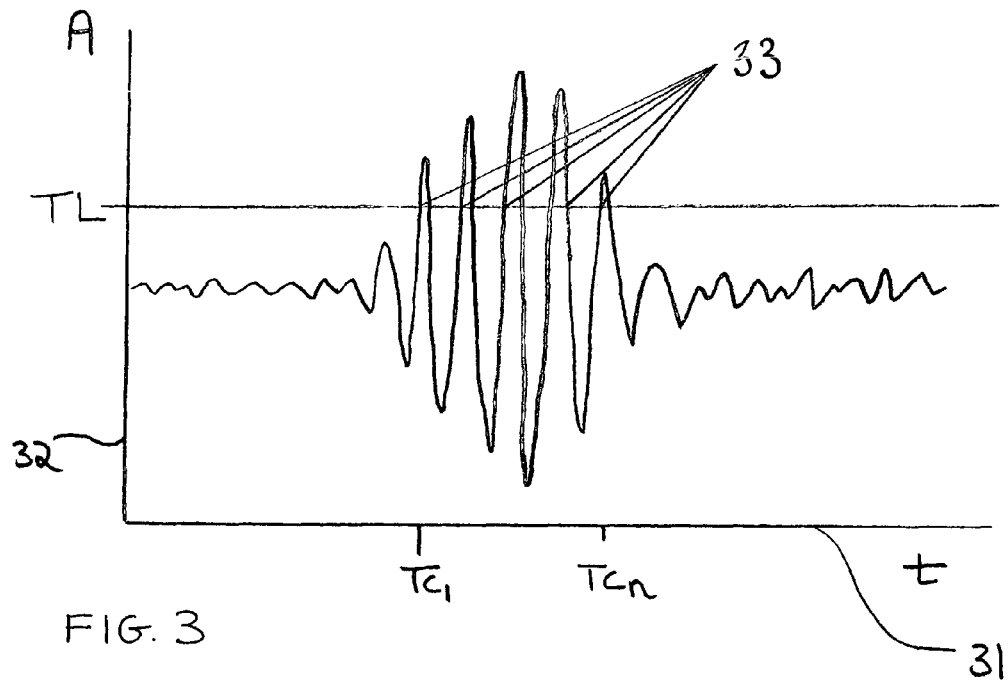
FIG. 3 is a graph of an AE waveform in which a number of threshold crossings is counted.

| REFERENCE NUMERALS | |
|---|---|
| FIG. 1 | illustrates a flow chart of the inventive method: |
| 11: | measure AE emitted from a bearing due to asperity contact, to provide a measured signal; |
| 12: | extract acoustic energy from the measured signal; |
| 13: | determine lubrication condition from the extracted acoustic energy. |
| FIG. 2 | illustrates an example of a system comprising a lubrication condition monitoring device that arranged to execute the inventive method: |
| 20: | Rolling element bearing |
| 21: | Housing |
| 22: | Bearing inner ring |
| 24: | Bearing outer ring |
| 25: | Rolling elements |
| 25s: | Surface of rolling elements |
| 26: | Inner raceway |
| 27: | Outer raceway |
| 28: | Acoustic emission sensor |
| 29: | Signal processor |
| FIG. 3 | illustrates a graph of signal pulse emitted from an AE event: |
| 31: | abscissa representing time, t |
| 32: | ordinate representing signal amplitude, A |
| 33: | threshold crossing |
| TL: | threshold level |
| $TC_1$: | time at which $1^{st}$ threshold crossing occurs |
| $TC_n$: | time at which final threshold crossing occurs |
| FIG. 4 | illustrates a graph of acoustic activity over time for a varying lubrication condition: |
| 41: | abscissa representing time, t |
| 42: | ordinate representing number of threshold crossings, n |
| $t_1$: | time at which oil is injected |
| FIG. 5 | illustrates a graph of the relationship between acoustic energy and specific film thickness |
| 51: | abscissa representing specific film thickness, λ |
| 52: | y-axis of graph representing acoustic energy, E |
| 54: | curve fitted through data points obtained with bearing speed of 6000 rpm |
| 55: | curve fitted through data points obtained with bearing speed of 4000 rpm. |

The invention claimed is:

1. A method of determining a lubrication parameter indicative of a lubrication condition in an oil-lubricated rolling element bearing, comprising:

measuring high-frequency structure-borne acoustic emissions associated with asperity contact between rolling contact surfaces of the bearing, to provide a measured signal;

extracting emitted acoustic energy from the measured signal; and determining the lubrication parameter from the emitted acoustic energy, on the basis of a power-law relationship between emitted acoustic energy and the lubrication parameter, wherein the power-law relation is expressed as:

$E(c)=B^*c^x$, where

E is the acoustic energy in the measured signal in volts,
c is the lubrication condition parameter (dimensionless),
B is a scaling factor (dimensionless constant), and
x is a scaling exponent (dimensionless constant).

2. A method of determining a lubrication parameter indicative of a lubrication condition in an oil-lubricated rolling element bearing, comprising:

measuring high-frequency structure-borne acoustic emissions associated with asperity contact between rolling contact surfaces of the bearing, to provide a measured signal;

extracting emitted acoustic energy from the measured signal; and determining the lubrication parameter from the emitted acoustic energy, on the basis of a power-law relationship between emitted acoustic energy and the lubrication parameter, wherein the determined lubrication parameter is a specific film thickness (X) of an oil film between the rolling contact surfaces of the bearing.

3. The method according to claim 1, wherein the determined lubrication parameter is a viscosity ratio (k) of the oil film.

4. The method according to claim 2, wherein the specific film thickness is determined on the basis of the relationship:

$E(\lambda)=B^*\lambda^{-0.36}$, where

E is the acoustic energy in the measured signal in volts
λ is the specific film thickness (dimensionless),
B is the scaling factor (dimensionless constant).

5. The method according to claim 3, wherein the viscosity ratio is determined on the basis of the relationship:

$E(k)=B^*k^{-0.47}$, where

E is the emitted acoustic energy in the sensed signal in volts,
K is the viscosity ratio, BG is the scaling factor.

6. The method according to claim 1, further comprising measuring bearing rotational speed and using the measured rotational speed as an input parameter to estimate the scaling factor in the relationship used to determine the lubrication parameter value.

7. The method according to claim 1, further comprising measuring bearing load and using the measured load as an input parameter to estimate the scaling factor in the relationship used to determine the lubrication parameter value.

8. The method according to claim 1, further comprising sending out a warning signal when the determined lubrication parameter falls below a predefined limit.

9. The method according to claim 1, wherein extracting further comprises extracting the emitted acoustic energy from the acoustic emissions in a frequency range of 250-700 KHz.

10. The method according to claim 1, wherein the measuring is performed using an acoustic emission sensor that is mounted on one of a bearing inner ring, a bearing outer ring or a housing in which the bearing is mounted.

* * * * *